United States Patent [19]

Schlesinger et al.

[11] 4,250,203

[45] Feb. 10, 1981

[54] CATIONICALLY POLYMERIZABLE COMPOSITIONS CONTAINING SULFONIUM SALT PHOTOINITIATORS AND ODOR SUPPRESSANTS AND METHOD OF POLYMERIZATION USING SAME

[75] Inventors: Sheldon I. Schlesinger, Windsor, N.J.; Dennis E. Kester, Newtown, Conn.

[73] Assignee: American Can Company, Greenwich, Conn.

[21] Appl. No.: 71,283

[22] Filed: Aug. 30, 1979

[51] Int. Cl.³ .......................... B05D 3/06; C08F 2/46; C08F 8/00

[52] U.S. Cl. ................... 427/44; 204/159.11; 204/159.13; 204/159.17; 204/159.24; 427/54.1; 427/386; 427/387; 427/388.1; 430/280

[58] Field of Search .................. 427/44, 54, 386, 387, 427/388.1; 430/280; 204/159.11, 159.15, 159.16, 159.18, 159.24, 159.13, 159.17

[56] References Cited

U.S. PATENT DOCUMENTS

| | | | |
|---|---|---|---|
| 2,807,648 | 9/1957 | Pitt | 260/607 |
| 3,374,160 | 3/1968 | Mao | 204/159.27 |
| 3,657,088 | 4/1972 | Heine et al. | 204/159.15 |
| 3,692,560 | 9/1977 | Rosenkranz et al. | 427/54 |
| 3,709,861 | 1/1973 | Anderson | 106/163 X |
| 3,711,391 | 1/1973 | Feinberg | 204/159.11 |
| 3,714,006 | 1/1973 | Anderson | 204/159.14 |
| 3,715,293 | 2/1973 | Sandner et al. | 204/159.14 |
| 3,742,089 | 6/1973 | Schroeter | 204/159.19 X |
| 3,855,180 | 12/1974 | Schroeter | 204/159.19 X |
| 3,875,094 | 4/1975 | Schroeter et al. | 204/159.15 X |
| 3,968,056 | 7/1976 | Bolon et al. | 204/159.15 X |
| 3,989,644 | 11/1976 | Bolon et al. | 204/159.11 X |
| 4,017,652 | 4/1977 | Gruber | 427/54 |
| 4,058,400 | 11/1977 | Crivello | 430/280 |
| 4,058,401 | 11/1977 | Crivello | 430/280 |
| 4,061,652 | 12/1977 | Schroeter et al. | 560/24 X |
| 4,069,054 | 1/1978 | Smith | 430/280 |
| 4,069,056 | 1/1978 | Crivello | 430/280 |
| 4,076,489 | 2/1978 | Schroeter et al. | 427/54 X |
| 4,081,276 | 3/1978 | Crivello | 430/280 |
| 4,082,891 | 4/1978 | Curry et al. | 428/412 |
| 4,088,801 | 5/1978 | Bolon et al. | 427/54 |
| 4,090,936 | 5/1978 | Barton | 204/159.18 |
| 4,116,788 | 9/1978 | Schmitt et al. | 204/159.23 |
| 4,138,255 | 2/1979 | Crivello | 430/280 |
| 4,156,035 | 5/1979 | Tsao et al. | 428/418 X |
| 4,173,476 | 11/1979 | Smith et al. | 430/280 |

FOREIGN PATENT DOCUMENTS 845746 1/1977 Belgium.

OTHER PUBLICATIONS

*Synthesis and Reactions of Triarylsulfonium Halides,* Wiegand et al., Nov. 1967.
*Ultraviolet Spectroscopy Study on Sulfonium Salts,* Ohkubo et al., Jan. 1971.
*Photopolymerization of Epoxides by Complex Salts of Sulfur Cations,* Ketley et al.
*Photoinitiated Cationic Polymerization Using Diaryliodonium Salts,* Crivello et al., Jul. 1977.
*UV Curing: Science & Technology,* Pappas, S. Peter.
*Triarylsulfonium Salts,* Crivello et al., Jan. 1978.
*Synthesis & Stereo Chemistry of Triarylsulfonium Salts,* Andersen et al., Jul. 1969.
*Synthesis, Spectra and Reactions of Some S-Alkylthiophenium Salts,* 1970.

*Primary Examiner*—Michael R. Lusignan
*Attorney, Agent, or Firm*—Robert P. Auber; Stuart S. Bowie; Peter L. Costas

[57] ABSTRACT

Photopolymerizable compositions using sulfonium salt photoinitiators to effect polymerization of cationically polymerizable monomers as essentially the sole polymerizable material additionally include an organic sulfur compound scavenger to reduce or eliminate the sulfur odor generated upon photodecomposition of the sulfonium salt photoinitiator. The scavengers are simultaneously activated by the electromagnetic radiation to react with the organic sulfur compound concurrently generated and are selected from the group consisting of aromatic ketones, benzoin compounds, aryloin oxime compounds, organic peroxide compounds, and benzil compounds.

18 Claims, No Drawings

CATIONICALLY POLYMERIZABLE COMPOSITIONS CONTAINING SULFONIUM SALT PHOTOINITIATORS AND ODOR SUPPRESSANTS AND METHOD OF POLYMERIZATION USING SAME

BACKGROUND OF THE INVENTION

For a number of years the coating industry has been engaged in substantial developmental programs in the quest for procedures which would allow the coating of substrates at high production rates with the coating being cured to a tack-free condition at a speed commensurate with the contiguous processing steps. The industry has desired to eliminate the volatile solvents required in many of the well-known coating processes because of potential hazards or because of the cost of equipment to handle the evolved solvent vapors. In addition, the industry has been seeking coating formulations which would produce coatings which were durable and which would permit substantial additional processing of the workpiece, such as metal forming operations where the substrate is metal strip or container bodies, blanks and closures, or where plastic strip and paperboard are coated and formed.

Epoxy coating formulations have long been recognized as affording desirable properties in the finished coating, especially the toughness to withstand further processing. However, the problem has remained to develop a low cost epoxy coating formulation which would combine the desired rheological properties for the coating application with both reasonable pot life and rapid curing in the production line.

In Schlesinger U.S. Letters Pat. No. 3,708,296 granted Jan. 2, 1973, there are disclosed photopolymerizable epoxide formulations containing diazonium salts as photoinitiators which polymerize rapidly upon exposure to electromagnetic radiation to provide durable coatings.

In Watt U.S. Letters Pat. No. 3,794,576 granted Feb. 26, 1974, there are described desirable epoxy formulations which combine the desired rheological properties with suitable pot life and rapid curing at ambient temperatures, by incorporation of a photoiniator and at least about 15 percent by weight of an epoxidic ester having two epoxycycloalkyl groups. However, such esters do materially increase the cost of the formulation as compared with the more conventional epoxide prepolymer materials.

Since the disclosures of Schlesinger and Watt, a number of patents and publications have appeared proposing various photoinitiators for the epoxy formulations which could replace the diazonium catalysts specifically described in the Schlesinger and Watt Patents. Among these are the sulfonium salt catalysts disclosed in Smith U.S. Pat. No. 4,069,054 granted Jan. 17, 1978; Barton U.S. Letters Pat. No. 4,090,936 granted May 23, 1978; and Crivello U.S. Letters Pat. Nos. 4,069,055 granted Jan. 17, 1978 and No. 4,058,401 granted Nov. 15, 1977.

Generally, these sulfonium compounds have the structural formula shown and described in Crivello U.S. Letters Pat. No. 4,058,401 at column 2, lines 1-20:

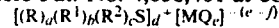

where R is a monovalent aromatic organic radical; $R^1$ is a monovalent organic aliphatic radical selected from alkyl, cycloalkyl and substituted alkyl; $R^2$ is a polyvalent organic radical forming a heterocyclic or fused ring structure selected from aliphatic radicals and aromatic radicals; M is a metal or metalloid; Q is a halogen radical; a is a whole number equal to 0 to 3 inclusive; b is a whole number equal to 0 to 2 inclusive; c is a whole number equal to 0 or 1; and where the sum of a+b+c is a value equal to 3 or the valence of S; d=e−f; f=valence of M and is an integer equal to from 2 to 7 inclusive; e is greater than f and is an integer having a value up to 8. Both General Electric Company and Minnesota Mining and Manufacturing Company have made efforts to commecialize catalyst systems using what appear to be mixtures of triarylsulfonium hexafluorophosphate compounds, but which are generally identified as triphenylsulfonium hexafluorophosphate.

Although this class of compounds is an effective photoinitiator, the range of ultraviolet radiation to which the triphenyl sulfonium hexafluorophosphate compounds are sensitive is somewhat limited. More recently, it has been found that bis-[4-(diphenylsulfonio)phenyl]sulfide bis-hexafluorophosphate compounds are effective photoinitiators with a broader range of spectral sensitivity in the ultraviolet range. The method of making such photoinitiators and the use thereof in the cationic polymerization of epoxy compounds are disclosed and claimed in Watt U.S. patent application Ser. No. 20,240 filed Mar. 14, 1979, and Chang U.S. patent application Ser. No. 20,514 filed Mar. 14, 1979, now U.S. Pat. No. 4,197,174, granted Apr. 8, 1980.

However, both of the above classes of sulfonium salt photoinitiators suffer from a common problem, namely, the evolution of malodorous organic sulfur compounds when the polymerizable compositions are subjected to electromagnetic radiation to effect decomposition thereof. These compounds are believed to be organic sulfides or mercaptans, and the term "organic sulfur compound" is used herein to generically encompass all such malodorous organic sulfur compounds resulting from the photodecomposition of sulfonium salt photoinitiators. This malodorous condition may have been sufficient to discourage more widespread adoption of such photoinitiators in commercial processes.

Accordingly, it is an object of the present invention to provide a novel photoinitiable cationically polymerizable composition utilizing sulfonium salt photoinitiators, which composition evidences clearly reduced or eliminated malodorous properties.

It is also an object to provide such a composition which is relatively stable during extended periods of storage and which will nevertheless polymerize rapidly to produce coatings with desirable mechanical properties.

Another object is to provide a novel polymerization process using such a composition and which is adaptable to a wide variety of high speed coating lines and which does not require extensive or expensive equipment to effect polymerization of the applied coating.

SUMMARY OF THE INVENTION

It has now been found that the foregoing and related objects may be readily attained in a photopolymerizable composition containing 50–99 percent by weight of a cationically polymerizable material as essentially the sole polymerizable material. There is incorporated at least 0.1 percent by weight of a sulfonium salt photoinitiator which decomposes upon exposure to electromagnetic radiation to generate a Lewis acid to initiate polymerization of the cationically polymerizable material, and a product of the decomposition includes a malodorous organic sulfur compound. The composition additionally includes 0.1 to 15 percent by weight of an organic sulfur compound scavenger operable to react with the organic sulfur compound released upon decomposition of the photoinitiator to reduce the sulfur odor generated by the decomposition. The scavenger is activated upon exposure to the electromagnetic radiation and is selected from the group consisting of aromatic ketones, benzoin compounds, aryloin oxime compounds, organic peroxide compounds, and benzil compounds. In addition to the essential cationically polymerizable material, sulfonium salt photoinitiator and organic sulfur compound scavenger, the composition may contain as optional additives vinyl chloride polymer, fillers, pigments, diluents, dyes and processing aids.

Preferably, the polymerizable material includes an epoxidic prepolymer material in an amount providing at least about 40 percent by weight thereof. The sulfonium salt photoinitiator may have the general structural formula set forth in the aforementioned Crivello U.S. Pat. No. 4,058,401, or it may be a bissulfonium salt having either of the following structural formulae:

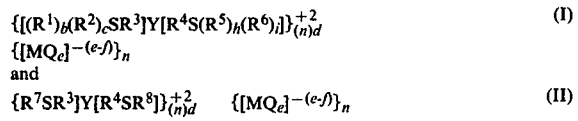

wherein Y may be omitted or may be a bridging atom or group which connects $R^3$ and $R^4$, e.g., a divalent sulfur —S—, a divalent oxygen —O—, a divalent nitrogen

or a divalent carbon

or a ketone group

wherein $R^2$ and $R^6$ are monovalent organic aliphatic radicals selected from alkyl, cycloalkyl and substituted alkyl; $R^1$ and $R^5$ are organic aromatic radicals which may or may not be ring-substituted; wherein $R^3$ and $R^4$ are organic aromatic radicals which may or may not be ring-substituted; wherein $R^7$ and $R^8$ are polyvalent organic radicals forming a heterocyclic or fused ring structure with the sulfur atom and may be the same or different; wherein $R^9$, $R^{10}$ and $R^{11}$ may be hydrogen, or substituted or unsubstituted alkyl or aryl groups; wherein b and h may be equal to the integer 0, 1 or 2; wherein c and i may be equal to the integer 0, 1 or 2; wherein the sum of b+c, or of h+i, is 2; wherein $d = \frac{1}{2}$ (e−f) and n is the multiplier of d necessary to produce a whole number; wherein f = the valence of M and is an integer from 2–7 inclusive; wherein e is greater than f and is an integer having a value up to 8.

Preferably, the sulfonium salt photoinitiator is present in an amount equal to 0.1–10 percent by weight of the composition. When the sulfonium salt photoinitiator is a sulfonium salt of the type described in the aforementioned Crivello patent and the scavenger is activated by the electromagnetic radiation to a free radical, it is desirably present in an amount equal to at least about one-half the molar equivalent of the sulfonium salt photoinitiator; when the scavenger is activated to a triplet state, it is desirably present in an amount equal to at least about the molar equivalent of the sulfonium salt photoinitiator. When the sulfonium salt photoinitiator is a bis-sulfonium salt and the scavenger is activated by electromagnetic radiation to a free radical, the scavenger is desirably present in an amount equal to at least about the molar equivaltent of the sulfonium salt photoinitiator; when the scavenger is activated to a triplet state, it is desirably present in an amount equal to at least about twice the molar equivalent of the bis-sulfonium salt photoinitiator.

In the method of polymerization of the present invention, the several components are admixed to provide a polymerizable composition, and this composition is then exposed to electromagnetic radiation to decompose the sulfonium salt photoinitiator and to generate a Lewis acid to polymerize the polymerizable material and to activate the scavenger to react with organic sulfur compounds generated thereby, the polymerization being characterized by substantial freedom from malodorous sulfur compounds.

In its most usual form, the method will involve the step of applying the photopolymerizable composition to a substrate as a coating prior to the step of exposure of the composition to electromagnetic radiation. If so desired, to effect rapid curing at ambient temperatures when the cycloaliphatic epoxides of the aforementioned Watt patent are not employed, the composition may be maintained at a temperature of 50°–90° C. for a period of 0.5 second–2 minutes following initiation of exposure to radiation in order to effect rapid curing to a tack-free condition.

DETAILED DESCRIPTION OF THE PREFERRED EMBODIMENTS

As previously indicated, the compositions of the present invention essentially comprise a mixture of a cationically polymerizable material, a sulfonium salt photoinitiator, and an organic sulfur compound scavenger. Upon exposure to electromagnetic radiation, the sulfonium salt photoinitiator decomposes to initiate polymerization of the cationically polymerizable material while at the same time producing a malodorous organic sulfur compound. The organic sulfur compound scavenger is also activated by the electromagnetic radiation and reacts with the organic sulfur compounds so as to reduce the sulfur odor.

The cationically polymerizable materials which may be used herein preferably comprise epoxidic prepolymer materials either alone or as the principal constituent. However, various other organic monomers are also known to be cationically polymerizable and may comprise either all or a part of the cationically polymerizable material. Such vinyl organic monomers include vinylidene aromatic hydrocarbons such as styrene; vinylacetamide; vinylethers such as isobutyl vinylether and n-octyl vinylether; acrolein; vinylarenes such as 1-vinylpyrene and acenaphthalene; vinyl carbazoles such as 9-vinylcarbazole and vinyl pyrrolidone; vinyl cycloaliphatics such as vinyl cyclohexane; conjugated dienes such as isobutylene, butadiene and isoprene. In addition, cyclic ethers such as oxetanes and oxolanes, e.g., tetrahydrofuran and trioxane, may be employed. Other groups of compounds comprise the cyclic esters such as the beta-lactones, e.g., propiolactones; and cyclic amines such as 1,3,3,trimethyl azetidine. Another class of cationically polymerizable materials comprises cyclic organosilicon compounds such as hexamethyl trisiloxane. Still another class of materials which can be used as the cationically polymerizable material comprises thermosetting organic condensation resins of an aldehyde such as urea formaldehyde resins, phenol formaldehyde resins, melamine formaldehyde resins, and the like, as described in Crivello U.S. Letters Pat. No. 4,102,687 granted July 15, 1978.

Moreover, the cationically polymerizable material may be a prepolymer or low molecular weight polymer, either of the vinyl family or of the epoxy family. Vinyl prepolymers include multifunctional vinylethers and low molecular weight diene polymers.

Suitable cationically polymerizable materials are described at length in Pappas, "UV CURING: SCIENCE AND TECHNOLOGY", (Technology Marketing Corporation, Stamford, Connecticut); Crivello U.S. Letters Pat. No. 4,150,988; Crivello U.S. Letters Pat. No. 4,102,687; and Crivello U.S. Letters Pat. No. 4,069,056.

As previously indicated, the preferred cationically polymerizable materials are comprised at least principally of epoxide prepolymer materials, and these may comprise any monomeric or oligomeric material containing at least one functional epoxy group or oxirane ring so that they may be polymerized upon opening of the oxirane ring. In addition, polymeric epoxy materials may be employed if they may be dispersed in the composition and are capable of undergoing further polymerization to produce a solid polymer. The epoxy compounds may be aliphatic, cycloaliphatic, aromatic or heretocyclic. The epoxidic prepolymer should contain no functional groups more basic than the oxirane ring and should be a solvent for the initiator and scavenger. Most desirably, the prepolymer should contain a reasonable percentage of epoxy compounds containing two or more epoxy groups per molecule.

The polymerizable epoxy material will comprise epoxide resins used either singly or in combination and will have an average epoxide value of about 0.1–1.0. The carbon chains having the epoxy groups may include additional substituents including ethers, esters, halogens, phosphates, and the like, and the compounds may include other polymerizable functional groups such as acrylates and silicones.

Typical epoxy materials are readily available commercially, the most common being those which are the product of bis-phenol A with epicholorohydrin or those resulting from the reaction of epichlorohydrin with a phenol/formaldehyde resin of relatively low molecular weight. Reference may be made to the HANDBOOD OF EPOXY RESINS by H. Lee and K. Neville (McGraw-Hill 1967) for various epoxides. In addition, the technical literature and patent literature both contain extensive discussions of various epoxidic prepolymer materials which are useful in the compositions of the present invention as will be demonstrated hereinafter.

In the aforementioned Watt U.S. Letters Pat. 3,794,576, there are described radiation-sensitive epoxidic blends containing at least about 15 percent by weight of an epoxidic ester having at least two epoxycycloalkyl groups per molecule in order to achieve rapid polymerization and curing of the composition at ambient temperatures upon exposure to ultraviolet radiation or the like. Such compounds are conveniently esters of an epoxidized cyclic alcohol and an epoxidized cycloalkanecarboxylic acid or esters of an alkylsubstituted (epoxycycloalkane)methanol and a dibasic acid. A number of suitable compounds are disclosed in the aforementioned Watt Patent.

Although not essential and sometimes undesirable, the polymerizable epoxy composition may contain diluents to improve viscosity, and these diluents may be reactive such as those produced by reaction of an alcohol or a phenol with epichlorohydrin. Exemplary of reactive diluents is the reaction product of nonylphenol with epicholorohydrin. The amount of diluent may vary from zero to as much as 45 percent of the polymerizable material if a reactive diluent is employed and is preferably less than 15 percent if nonreactive diluents such as dibutylphthalate are employed.

For some applications, the composition may contain an inert pigment or dye to provide a desired coloration. Generally, such pigments and dyes will comprise less than about 45 percent by weight of the composition. For certain applications, it may be desired to include an inert filler such as talc or silica where such fillers will not adversely affect the desired properties for the cured composition. They will normally comprise less than 45 percent by weight and preferably less than 25 percent by weight of the polymerizable composition.

Recently, it has been found that desirable coating compositions can be prepared by admixing an epoxidic prepolymer material and a vinyl chloride dispersion polymer. As pointed out in the copending application of Joseph M. Guarnery et al, Ser. No. 21,914 filed Mar. 19, 1979 and entitled POLYMERIZABLE COATING COMPOSITION CONTAINING POLYMERIZABLE EPOXIDE COMPOUND AND VINYL CHLORIDE DISPERSION POLYMER AND METHOD OF COATING UTILIZING SAME AND COATED ARTICLES PRODUCED THEREBY, the vinyl chloride dispersion polymer should be wettable by, but substantially insoluble in, the epoxy prepolymer material. Generally, the polymers will be homopolymers of vinyl chloride, although copolymers of vinyl chloride with up to 15 percent by weight, and preferably less than 10 percent by weight, of vinyl acetate may be employed. Conventionally, such dispersion polymers have a high molecular weight as represented by an inherent viscosity of 0.60–1.60 as determined by the method of ASTM D1243-66 and a particle size of 0.5–20.0 microns, and are produced by emulsion polymerization processes.

The epoxy and vinyl chloride resin components are generally admixed to form the polymerizable material in a weight ratio of 35–80 parts epoxy prepolymer material to 20–60 parts vinyl chloride polymer. Preferably, the ratio is 45–65 parts epoxy prepolymer material to 35–55 parts vinyl chloride polymer. The ratio may be varied to modify the difference between the glass transition temperature (Tg) of the two components within the coating. This is desirable to ensure that the processing temperature to which the coated substrate will be subjected will normally fall between the two glass transition temperatures.

When a vinyl chloride dispersion polymer is to be included in the epoxidic prepolymer material, the epoxy compounds should not include more than 15 percent by weight thereof of compounds having epoxycycloalkyl groups and preferably should exclude such compounds. Thus, the desirable epoxycycloalkyl esters of the aforementioned Watt U.S. Letters Pat. No. 3,794,576 should be excluded or included in an amount of less than 15 percent by weight since they have been found to undesirably swell the dispersion polymer and unduly affect rheological properties. In addition, these esters appear to penetrate into the vinyl chloride polymer so that they do not provide the ambient temperature curing benefits of the epoxy compositions of the aforementioned Watt Patent.

As previously indicated, the sulfonium salt photoinitiator may be of the tri(aryl/alkyl/heterocyclic) type of the aforementioned Crivello Patent or of the bis-[tri(aryl/alkyl/heterocyclic)] type of the aforementioned Watt and Chang patent applications. The tri(aryl/alkyl/heterocyclic) sulfonium salt photoinitiators are discussed at length in the aforementioned Crivello U.S. Letters Pat. No. 4,058,041 and Smith U.S. Letters Pat. No. 4,069,054. The general formula for this class of photoinitiator is set forth in the aforementioned Crivello Patents:

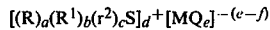

where R is a monovalent aromatic organic radical; $R^1$ is a monovalent organic aliphatic radical selected from alkyl, cycloalkyl and substituted alkyl; $R^2$ is a polyvalent organic radical forming a heterocyclic or fused ring structure selected from aliphatic radicals and aromatic radicals; M is a metal or metalloid; Q is a halogen radical; a is a whole number equal to 0 to 3 inclusive; b is a whole number equal to 0 to 2 inclusive; c is a whole number equal to 0 or 1; and where the sum of a+b+c is a value equal to 3 or the valence of S; d=e−f; f=valence of M and is an integer equal to from 2 to 7 inclusive; and e is greater than f and is an integer having a value up to 8.

Exemplary of such sulfonium salt photoinitiators are the following: triphenylsulfonium tetrafluoroborate, methyldiphenylsulfonium tetrafluoroborate, dimethylphenylsulfonium hexafluorophosphate, triphenylsulfonium hexafluorophosphate, triphenylsulfonium hexafluoroantimonate, diphenylnaphthylsulfonium hexafluoroarsenate, tritolylsulfonium hexafluorophosphate, trifluoromethyldiphenylsulfonium tetrafluoroborate, and dimethylnaphthylsulfonium hexafluorophosphate. Additional compounds may be found in the aforementioned Crivello and Smith patents, as well as in Crivello et al "Triaryl Sulfonium Salts: A New Class of Photoinitiators for Cationic Polymerization", JOURNAL OF RADIATION CURING, Volume 5, pages 2, 10–11, January 1978, and Pappas "UV CURING: SCIENCE AND TECHNOLOGY", (Technology Marketing Corporation, Stamford, Connecticut).

The second class of sulfonium salt photoinitiators may have any one of the following general formulae:

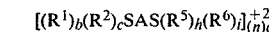
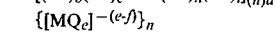

-continued

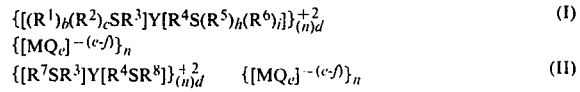

wherein Y may be omitted or may be a bridging atom or group which connects $R^3$ and $R^4$, e.g., a divalent sulfur —S—, a divalent oxygen —O—, a divalent nitrogen

or a divalent carbon

or a ketone group

wherein $R^2$ and $R^6$ are monovalent organic aliphatic radicals selected from alkyl, cycloalkyl and substituted alkyl; $R^1$ and $R^5$ are organic aromatic radicals may or may not be ring-substituted; wherein $R^3$ and $R^4$ are organic aromatic radicals which may or may not be ring-substituted; wherein $R^7$ and $R^8$ are polyvalent organic radicals forming a heterocyclic or fused ring structure with the sulfur atom and may be the same or different; wherein $R^9$, $R^{10}$ and $R^{11}$ may be hydrogen, or substituted or unsubstituted alkyl or aryl groups; wherein A is equal to an aromatic ring system, either monocyclic or polycyclic, or a heterocyclic aromatic, monocyclic or polycyclic ring system, or an aromatic or heterocyclic ring system condensed with a cycloaliphatic ring system; wherein b and h may be equal to the integer 0, 1 or 2; wherein c and i may be equal to the integer 0, 1 or 2; wherein the sum of b+c, or of h+i, is 2; wherein d=½ (e−f) and n is the multiplier of d necessary to produce a whole number; wherein f=the valence of M and is an integer from 2–7 inclusive; wherein e is greater than f and is an integer having a value up to 8.

Simple methods for making such salts are described in the aforementioned United States applications of Watt and Chang. Exemplary of this class of sulfonium salt photoinitiator are bis-[4-(diphenylsulfonio) phenyl]sulfide bis-hexafluorophosphate; bis-[4-(diphenylsulfonio) phenyl]ether bishexafluorophosphate; bis-[4-(diphenylsulfonio) phenyl]ketone bishexafluorophosphate; bis-[4-(tetramethylenesulfonio) phenyl]sulfide bishexafluorophosphate; bis-[4-(tetramethylenesulfonio) phenyl]sulfide bistetrafluoroborate; and bis-[4-(diphenylsulfonio) phenyl]sulfide chlorostannate.

The amount of the sulfonium salt photoinitiator may vary within a fairly wide range of 0.2–10 percent by weight of the composition, recognizing that at least about 0.1 percent by weight, based upon the polymerizable material, is generally necessary to initiate polymerization. To effect polymerization rapidly, the amount should comprise at least about 0.5 percent by weight of the polymerizable material. Although amounts of up to 5 percent by weight provide increasing reaction rate, amounts thereabove provide no significant additional benefit in reaction rate and tend to deleteriously affect the physical properties of the polymer produced. Thus, a practical upper limit for the sulfonium salt photoinitiator is 10 percent by weight, based upon the weight of polymerizable material, and the preferred range is 0.5-4.0 percent.

As previously indicated, the organic sulfur compound scavenger is selected from the group consisting of aromatic ketones (e.g., phenone compounds and xanthone compounds), benzoin compounds, aryloin oxime compounds, organic peroxide compounds, benzil compounds, and is characterized by the facts that it will be activated upon exposure to electromagnetic radiation of the type utilized to decompose the photoinitiator either within or outside the absorption band of the photoinitiator and that its activated form will react with the organic sulfur compound released upon decomposition of the sulfonium salt photoinitiator to reduce the attendant sulfur odor.

The scavenger may be activated by radiation in the wavelength of the light used to decompose the sulfonium salt photoinitiator but it should not so strongly compete in the wavelength needed to decompose the sulfonium salt photoinitiator as to prevent the effective decomposition of the photoinitiator. It should be soluble in the polymerizable material or the composition, and it should not unduly affect the physical properties of the polymer. The free radical or triplet generated should be sufficiently stable to react with the organic sulfur compounds, and the reaction product with the sulfur compound should have low volatility and add no unpleasant odor. Moreover, the reaction product should itself not be subject to photolysis or thermolysis at the conditions of curing or post-treatment.

The aryloin oxime compounds have the following general structural formula:

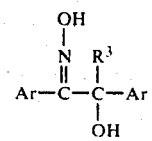

The aryl groups may be a benzene ring or a polynuclear ring, and the ring structure may be substituted with alkyl, alkoxy, aryloxy, carbonyl, hydroxy, carboalkoxy, halogen and nitro groups; basic substituents such as amine groups should not be employed. $R^3$ may be hydrogen or an alkyl group. Exemplary of such compounds is α-benzoin oxime.

The organic peroxides have the general structural formula:

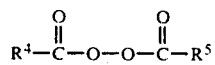

wherein $R^4$ and $R^5$ may be an alkyl or an aryl group. Both the alkyl and aryl groups may be substituted by alkyl, alkoxy, aryloxy, carbonyl, hydroxy, carboalkoxy, halogen and nitro groups; basic substituents such as amine groups should not be employed. Exemplary of such peroxide compounds are benzoyl peroxide, cumene peroxide, and dicumyl peroxide.

The benzil compounds have the following general structural formula:

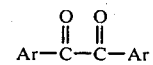

The aryl groups may be unsubstituted or substituted with alkyl, alkoxy, aryloxy, carbonyl, hydroxy, carboalkoxy, halogen and nitro groups; basic substituents such as amine groups should not be employed. Exemplary of such compounds are benzil, 4-chlorobenzil, and 4,4'-chlorobenzil.

The benzoin compounds have the following general structural formula:

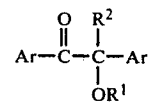

wherein the aryl radical may be a benzene ring or a polynuclear ring, and the ring structure may be substituted with alkyl, alkoxy, aryloxy, carbonyl, hydroxy, carboalkoxy, halogen and nitro groups; basic substituents such as amine groups should not be employed. $R^1$ may be hydrogen or an alkyl, aryl or cycloalkyl group; $R^2$ may be hydrogen or an alkyl, aryl or heterocyclic group. Exemplary of such benzoin compounds are benzoin methylether, benzoin isobutylether and methylbenzoin methylether.

The last class of compounds comprise the organic ketones of which the phenones and xanthones have proven particularly effective.

The phenone compounds have the following structural formula:

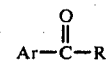

wherein the aryl radical may be a benzene ring or a polynuclear ring, and the ring structure may be substituted with alkyl, alkoxy, aryloxy, carbonyl, hydroxy, carboalkoxy, halogen and nitro groups; basic substituents such as amine groups should not be employed. R may be an alkyl, aryl or heterocyclic group and it too may be substituted by the same components as indicated for the aryl group. Exemplary of such phenone compounds are acetophenone, α,α-diethoxyacetophenone and α,α-dimethoxy-α-phenyl acetophenone.

The xanthone compounds have the general formula:

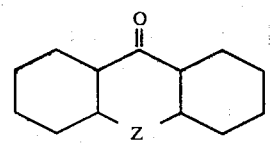

wherein Z may be oxygen or sulfur to provide a xanthone or thioxanthone and the outer rings may be unsubstituted or substituted with alkyl, alkoxy, aryloxy, carbonyl, hydroxy, carboalkoxy, halogen and nitro groups; basic substituents such as amine groups should not be employed. Exemplary of such compounds are xanthene-9-one (or 9-xanthone), thioxanthene-9-one (or thioxanthone), and 2-chlorothioxanthone.

The amount of the organic sulfur compound scavenger may vary within fairly wide limits of 0.1–15 percent by weight of the composition depending upon the amount of the sulfonium salt photoinitiator employed and upon the possible deleterious effect which unnecessarily large amounts of the organic sulfur compound scavenger may have upon the physical properties of the polymer. Generally, it is desirable to provide the organic sulfur compound scavenger in an amount equal to at least 50 percent by weight of that necessary to theoretically react with the organic sulfur compounds produced by decomposition of the sulfonium salt photoinitiator and preferably in an amount equal to 1–2 times that theoretically required to react with the organic sulfur compounds.

In some instances, the organic sulfur compound scavengers generate free radicals which are believed to couple or react with the organic sulfur compound in a manner to be described more fully hereinafter. In those instances, each molecule of the scavenger generates two free radicals and therefore is available to theoretically react with two molecules of the organic sulfur compound generated by two moles of the tri(aryl/alkyl/heterocyclic) sulfonium type catalyst or by one mole of the bis-[tri(aryl/alkyl/heterocyclic)]sulfonium type catalyst. Other organic sulfur compound scavengers disclosed herein, when exposed to electromagnetic radiation, form a molecule in the triplet state in which it will react with a single molecule of organic sulfur compound generated by the decomposition of the sulfonium salt photoinitiator. Thus, it is theoretically required to have one mole of a triplet type scavenger for each mole of a tri(aryl/alkyl/heterocyclic) sulfonium type of photoinitiator and two moles for each mole of a bis-[tri(aryl/alkyl/heterocyclic)] sulfonium type of photoinitiator.

Of the various classes of compounds, the benzoin compounds have proven highly advantageous in that they are highly effective in relatively small amounts and tend to affect physical properties only minimally. Benzoin itself is thus useful in an amount providing 0.5–1.0 mole per mole of tri(aryl/alkyl/heterocyclic) type sulfonium salt or 0.6–2.0 mole per mole of bis[tri(aryl/alkyl/heterocyclic)] type sulfonium salt.

The theory of operation is not fully understood but the following explanation is believed to apply. It is known that the sulfonium salt photoinitiators of the present invention will decompose upon exposure to electromagnetic radiation so as to provide a Lewis acid which is effective to intiate polymerization of the cationically polymerizable material. The term "Lewis acid" as used herein is intended to encompass compounds produced by decomposition and which will directly or indirectly receive an electron pair from the monomer to initiate polymerization, as for example from the oxygen of the oxirane ring to open the oxirane ring. The classic Lewis Acid precursor decomposition mechanism is described in the aforementioned Watt U.S. Pat. No. 3,794,576 with respect to a diazonium initiator. As is well known, the term "Lewis acid" in its broad scope includes protonic or Bronsted acids.

The decomposition mechanism for triarylsulfonium salts to provide an indirectly formed Lewis Acid has been postulated by Crivello et al in "Triarylsulfonium Salts: A New Class of Photoinitiators for Cationic Polymerization" in JOURNAL OF RADIATION CURING, Vol. 5, page 2 (January 1978). The authors postulate that the decomposition of the diaryl- and triarylsulfonium salts produce a Bronsted acid which in turn provides a proton which will function as the Lewis Acid to accept electrons from an oxygen of an oxirane ring in an epoxide monomer and initiate polymerization in accordance with the following mechanism, as shown in equations (1)–(3):

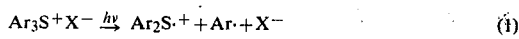

$$Ar_3S^+X^- \xrightarrow{h\nu} Ar_2S\cdot^+ + Ar\cdot + X^- \qquad (1)$$

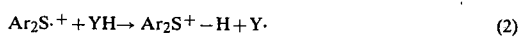

$$Ar_2S\cdot^+ + YH \rightarrow Ar_2S^+ - H + Y\cdot \qquad (2)$$

$$AR_2S^+ - H \rightarrow AR_2S + H^+ \qquad (3)$$

Regardless of the theory of the action embraced, it is apparent that the photoinitiator is decomposing to generate in the reaction medium an electron acceptor acting as a Lewis acid to open an oxirane ring in an epoxide compound or otherwise accepting an electron pair from other cationically polymerizable monomers and thereby initiating cationic polymerization of the monomer material. The reaction then proceeds as additional monomer units are activated until all of the monomer has been polymerized or until impurities interfere with the reaction mechanism.

The theory of the origin of the unpleasant odor is not fully understood although it is believed likely to be due to an organic sulfide or mercaptan formed in the course of photolysis. It is believed that phenyl sulfide is formed during the photolysis but that it forms benzenethiol in the presence of a hydrogen atom donor molecule in accordance with the following equations (4) and (5):

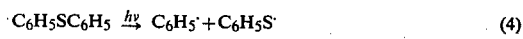

$$C_6H_5SC_6H_5 \xrightarrow{h\nu} C_6H_5\cdot + C_6H_5S\cdot \qquad (4)$$

$$C_6H_5S\cdot + YH \rightarrow C_6H_5SH + Y\cdot \qquad (5)$$

However, another possibility is the direct interaction of an aryl sulfide or other thioaryl radical with a hydrogen donor molecule.

The theory of operation of the organic sulfur compound scavenger in the compositions of the present invention is also not fully understood. It is postulated that the thioaryl radicals or other organic sulfide radicals will react with another free radical produced by the photolysis of the organic sulfur compound scavenger to form a reaction product which is much less volatile or which is more pleasant and acceptable, and possibly less toxic, than the organic sulfur compound. Moreover, it is possible that the resulting product of this interaction is trapped in the polymerized composition.

Assuming that the organic sulfur compound scavenger is one which generates a free radical, the following reactions (6)–(8) may be postulated with respect to organic sulfides or mercaptans:

$$R\cdot + ArS\cdot \rightarrow ArSR \qquad (6)$$

$$R^1\cdot + ArSH \rightarrow ArS\cdot + R^1H \qquad (7)$$

$$ArS\cdot + R^1\cdot \rightarrow ArSR^1 \qquad (8)$$

The free radical R· may be of the type which may combine with the ArS· radical as in equation (6), or it may be of the type $R^1\cdot$ that abstracts a hydrogen from the already formed mercaptan ArSH as in equation (7).

The organic sulfur compound scavenger, as indicated above, may generate a true free radical which is represented by benzoin in equation (9) below, or it may form a triplet state, as illustrated by benzophenone in equation (10) below:

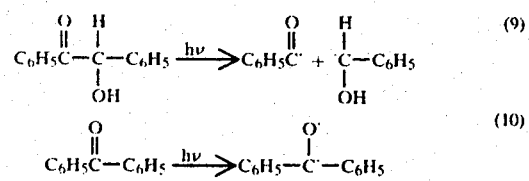

(9)

(10)

Regardless of the theory of operation, it has been found that the compositions of the present invention which employ the organic sulfur compound scavengers defined herein evidence greatly suppressed odors of the type which have heretofore typified compositions containing sulfonium salt photoinitiators.

As indicated, the photoinitiator is decomposed into a Lewis acid by exposure to electromagnetic radiation. Although electron beam bombardment, X-ray radiation, and other similar forms of high energy radiation may be employed for this purpose, exposure to ultraviolet radiation has been found highly satisfactory and is desirable for commercial applications. The exposure to radiation normally required may be of extremely short duration, periods of about one-half to three seconds being normally adequate for most compositions depending upon the intensity of the radiation at the surface. However, for relatively thick deposits of the composition, it may be desirable to extend the period of exposure to five seconds or even more, to ensure adequate penetration of the radiation through the depth of the coating.

In the polymerization of epoxide prepolymer compositions which do not include the desirable epoxycycloalkyl compounds of the aforementioned Watt U.S. Pat. No. 3,794,576 to provide a rapid cure rate at ambient temperatures, it is possible to obtain rapid polymerization of at least the surface portion by maintaining the composition within a relatively narrow elevated temperature range for a period of 0.5 second-2 minutes following initiation of exposure to the electromagnetic radiation. This will produce the desired rapid polymerization of the epoxidic prepolymer material to a tack-free surface condition within a period of less than 30 seconds. Although this elevated temperature range may extend from 50° C. to as high as 90° C., it is generally held within the range of 55°-75° C. to obtain the desired rate of polymerization while avoiding adverse effects on the resulting polymer and the desired physical properties.

The temperature of the composition may be elevated to the desired temperature range by any suitable means including induction heating when a metallic substrate or container is employed; conductive heating; convection heating; and radiation heating by exposure to a source of suitable radiant heat such as infrared lamps. For convenience and for minimization of the equipment requirements, infrared radiation provided by suitable lamps is most desirably employed in conjunction with the source of ultraviolet radiation used to produce decomposition of the initiator.

The compositions of the present invention are particularly useful for making durable coatings for either aesthetic or protective purposes. Epoxy compositions find particular advantage in the field of graphic arts because of the resistance of the coating to solvents and chemicals as well as to abrasion, because of the excellent adhesion to various surfaces including metals, and because of the ability to withstand drawing and forming operations.

Illustrative of the efficacy of the present invention are the following specific examples wherein all parts are parts by weight unless otherwise indicated.

EXAMPLE ONE

A series of formulations were prepared using different compounds as potential odor suppressors or organic sulfur compound scavengers in varying amounts in accordance with the following basic formulation:

| Component | Parts |
| --- | --- |
| 3,4-epoxy cyclohexylmethyl-3,4-cyclohexane carboxylate (sold by Ciba-Geigy under the designation CY-179 | 80 |
| butanediol aliphatic diglycidyl ether (sold by Ciba-Geigy under the designation RD-2) | 20 |
| silicone resin flow agent (sold under the designation SR-82 by General Electric) | 2 |
| sulfonium salt photoinitiator (a 50% by weight solution in propylene carbonate of a photoinitiator composition sold by General Electric under the designation UV Cat-14) | 2 |
| additive | as indicated |

The formulations were applied to prebaked tin-free steel panels to provide 10 milligrams of coating formulation per four square inches of surface. The coatings were then cured by exposure to two 200 watt/inch ultraviolet lamps at a lineal speed of 110 feet per minute. The relative humidity was measured at 32 percent and the ambient temperature at 22° C. Immediately following exposure, the panels were held close to the nose and smelled.

| Test Formulation | Additive | Parts | Mercaptan Smell Test |
| --- | --- | --- | --- |
| A | none | — | strong mercaptan odor |
| B | benzophenone | 0.5 | slight reduction in mercaptan odor |
| C | benzophenone | 1.0 | significant reduction in mercaptan odor |
| D | benzophenone | 2.0 | significant reduction in mercaptan odor |
| E | benzophenone | 4.0 | significant reduction in mercaptan odor |
| F | benzophenone | 6.0 | significant reduction in mercaptan odor |
| G | acetophenone | 2.0 | reduced mercaptan odor; very strong aromatic odor |
| H | acetophenone | 6.0 | reduced mercaptan odor; very strong aromatic odor |
| I | benzoin isobutylether | 0.5 | some reduction in mercaptan odor |
| J | benzoin isobutylether | 1.0 | significant reduction in mercaptan odor; slight aromatic odor |
| K | benzoin isobutylether | 2.0 | significant reduction in mercaptan odor; slight aromatic odor |
| L | benzoin | 6.0 | some aromatic odor |
| M | benzoin isopropylether | 2.0 | reduced mercaptan odor |
| N | benzoin isopropylether | 6.0 | reduced mercaptan odor |

EXAMPLE TWO

As indicated previously, it is believed that phenyl sulfide is generated by the sulfonium salt photoinitiator upon photolysis, and that further reaction produces the mercaptan or malodorous organic sulfur compound. It is assumed that 6.04 grams of a 33.3 percent by weight solution of bis[4-(diphenylsulfonio) phenyl] sulfide bis-hexafluorophosphate in propylene carbonate will produce 0.888 grams of phenyl sulfide. The following basic formulation having a controlled amount of phenyl sulfide (in the carrier propylene carbonate) was prepared to better evaluate the efficacy of the scavenger compounds:

| Component | Parts |
| --- | --- |
| 3,4-epoxy cyclohexylmethyl-3,4-cyclohexane carboxylate (sold by Ciba-Geigy under the designation CY-179) | 95.31 |
| propylene carbonate | 3.84 |
| purified phenyl sulfide | 0.847 |

To equal portions of this basic formulation each weighing 17.36 grams were added the various compounds believed to be organic sulfur compound scavengers. The compositions were then coated onto tin-free steel panels with a No. 3 wire wound rod. Prior to exposure, the coatings had a sweet, ester-like odor characteristic of phenyl sulfide. The panels were exposed to ultraviolet radiation using a (60 watts/inch) UVIARC lamp at a two inch distance for a period of five seconds. The exposed panels were smelled to determine the presence of a mercaptan odor.

| Specimen | Additive | Wt. % Additive Based on Epoxide | Smell |
| --- | --- | --- | --- |
| A | none | — | strong mercaptan odor |
| B-1 | benzophenone | 6.91 | sweet odor |
| B-2 | benzophenone | 3.46 | slight mercaptan odor |
| B-3 | benzophenone | 0.864 | reduced mercaptan odor |
| C-1 | benzil | 7.98 | slight mercaptan odor |
| C-2 | benzil | 3.99 | reduced mercaptan odor |
| D | diethoxyacetophenone | 3.66 | no mercaptan odor |
| E-1 | 2,2-dimethoxy-2 phenyl acetophenone | 1.22 | no mercaptan odor |
| E-2 | 2,2-dimethoxy-2 phenyl acetophenone | 0.610 | no mercaptan odor |
| F | 4-chlorobenzophenone | 6.18 | no mercaptan odor but alternate odor |
| G-1 | 2-chlorobenzophenone | 6.18 | no mercaptan odor |
| G-2 | 2-chlorobenzophenone | 4.12 | slight mercaptan odor |
| H-1 | 4,4'-dichlorobenzophenone | 7.17 | slight mercaptan odor |
| H-2 | 4,4'-dichlorobenzophenone | 4.77 | no mercaptan odor |
| I-1 | benzoin | 1.01 | no mercaptan odor but faint almond odor |
| I-2 | benzoin | 0.084 | slight mercaptan odor |
| J | benzoin methylether | 1.08 | no mercaptan odor but faint almond odor |
| K-1 | benzoin ethylether | 1.14 | slight mercaptan odor and sweet odor |
| K-2 | benzoin ethylether | 4.56 | no mercaptan odor |

EXAMPLE THREE

Triphenyl sulfonium hexafluorophosphate (TPS) was prepared in accordance with the method of J. Knapcyk et al, Journal of American Chemical Society, Volume 91, page 145 (1969). The following standard formulation was prepared:

| Component | Parts |
| --- | --- |
| diglycidyl ether of bis-phenol A (sold by Shell Chemical) under the designation EPON-825) | 55 |
| 3,4-epoxy chclohexylmethyl-3,4-cyhclohexane carboxylate (sold by Ciba-Geigy under the designation CY-179) | 30 |
| epoxy ($C_{12}$-$C_{14}$)alkylglycidylether (sold by Proctor & Gamble under the designation Epoxide #8) | 15 |
| TPS solution (33.3% in propylene carbonate) | 6.04 |

To aliquots of this formulation were added various organic sulfur compound scavengers in the amounts indicated. The compositions were coated on paperboard specimens with a No. 3 wire wound rod and exposed to a 360 watt UVIARC lamp. The specimens were smelled immediately after exposure.

| Specimen | Additive | %, Wt. Epoxide Formulation | Exposure, Seconds | Smell |
| --- | --- | --- | --- | --- |
| A | 2,2-diethoxyacetophenone | 2.74 | 10 | sweet odor |
| B | 2,2-dimethoxy 2-phenyl acetophenone | 1.22 | 10 | sweet odor |
| C | benzoin | 1.01 | 10 | sweet odor |
| D | benzoin methylether | 1.08 | 10 | sweet odor |
| E | 4-chlorobenzophenone | 4.12 | 15 | sweet odor |
| F | benzophenone | 6.91 | 15 | sweet odor |
| G | none | — | 5 | mercaptan odor |

EXAMPLE FOUR

To test the effectiveness of the compositions of the present invention on a high speed coating line, the following varnish formulation was prepared:

| Component | Parts |
| --- | --- |
| 3,4-epoxy cyclohexylmethyl-3,4-cyclohexane carboxylate (sold by Ciba-Geigy under the designation CY-179) | 24.17 |
| cresyl glycidyl ether (sold by Celanese Corp. under the designation EPIREZ 5011) | 14.59 |
| bis-(3,4-epoxycyclohexylmethyl) adipate (sold by Union Carbide under the designation ERL 4299) | 58.35 |
| silicone resin flow agent (sold under the designation SR-82 by General Electric) | 2.04 |
| SL-92 (Daniels) | 0.20 |
| liquid lanolin | 0.50 |
| fluorocarbon surfactant (sold by Minnesota Mining & Manufacturing under the designation FC-430) | 0.10 |
| sulfonium salt photoinitiator (50% by weight solution in propylene carbonate sold by General Electric under the designation UV Cat 14) | 3.0 |

To one aliquot of the formulation was added 1.1 percent by weight benzoin. In each test, tin-free steel end stock was coated in the commercial coating equipment and cured with 6 ultraviolet lamps. The coated stock moved there under at a lineal speed of 240 feet per minute. In the test using the unmodified varnish, the cured stock generated a strong mercaptan odor. In the test using the benzoin-modified formulation, the cured stock evidenced no mercaptan odor but a pleastant sweet almond odor.

EXAMPLE FIVE

The following resin blend for a varnish coating formulation was prepared:

| Component | Parts |
| --- | --- |
| 3,4-epoxy cyclohexylmethyl-3,4-cyclohexane carboxylate (sold by Ciba-Geigy under the designation CY-179) | 76.11 |
| butanediol aliphatic diglycidyl ether (sold by Ciba-Geigy under the designation RD-2) | 19.04 |
| silicone resin flow agent (sold under the designation SR-82 by General Electric) | 2.35 |
| unsaturated polycarboxylic acid (sold by Mallinkrodt Chemical Co. under the designation BYK P-104) | 0.49 |

To 16.55 gram portions of this formulation were added a 50 percent by weight solution of impure bis-[4-diphenylsulfonio) phenyl] sulfide bishexafluorophosphate in propylene carbonate as the photoinitiator and different organic compounds to test their efficacy as sulfide scavengers. These compositions were then coated onto aluminum test panels with a No. 3 wire wound rod and cured under a 360 watt UVIARC lamp (60 watts/inch output). The exposure times indicate the time required to cure the coating to a tack-free condition.

| Catalyst Solution, gm. | Additive | Amount, gm. | Cure Time, Sec. | Odor |
| --- | --- | --- | --- | --- |
| 0.666 | none | — | 3 | strong mercaptan odor |
| 0.659 | αbenzoin oxime | 0.424 | 5 | some reduction in mercaptan odor |
| 0.666 | benzoyl peroxide | 0.763 | 3 | no mercaptan odor; sweet odor |
| 0.444 | xanthene-9-one | 0.274 | 3 | reduction of mercaptan odor |
| 0.666 | thioxanthone | 0.167 | 3 | slight reduction of mercaptan odor |
| 0.666 | 2-chlorothioxanthone | 0.259 | 3 | some reduction of mercaptan odor |
| 0.666 | 2,2-azobis-isobutyronitrile | 0.516 | 3 | no noticeable reduction in mercaptan odor |

EXAMPLE SIX

To test the effect upon physical properties, the coating formulation of Example Five was prepared in three aliquots of 16.55 grams to each of which were added 0.666 grams of bis-[4-diphenylsulfonio) phenyl] sulfice bishexafluorophosphate in propylene carbonate (a 50% solution). To one of these was added 0.167 gram benzoin; and to another was added 1.00 gram benzoin. All coatings of the compositions on aluminum panels exposed to ultraviolet radiation for only one second showed a fingerprint immediately after exposure; the coating without benzoin cured print-free after one second whereas the benzoin-containing coatings required 2–3 seconds. All coatings were immediately print-free when exposed to ultraviolet radiation for 3 seconds.

The softening point of the coatings were determined after a period of 24 hours following ultraviolet exposure:

| Benzoin, gm. | UV exposure sec. | Softening Point, °C. |
| --- | --- | --- |
| 0.0 | 1 | 85.4 |
| 0.0 | 3 | 87.7 |
| 0.167 | 1 | 77.8 |
| 0.167 | 3 | 83.5 |
| 1.00 | 1 | 71.7 |
| 1.00 | 3 | 80.8 |

Adhesion was measured by applying an adhesive tape to the coating after it had cured for 24 hours after exposure to ultraviolet radiation and then pulling the tape. All coatings failed this adhesion test unless baked for 4 minutes at 210° C. following ultraviolet exposure.

All coatings passed a test involving rubbing 100 times with a pad wet with methylethylketone (MEK).

Thus, the odor controlled formulations evidenced little difference in cure rate, no difference in adhesion or MEK rub resistance, and only a slight lowering of softening point.

From the foregoing detailed specification and examples, it can be seen that the photopolymerizable compositions of the present invention utilize sulfonium salt photoinitiators but evidence clearly reduced or eliminated sulfur or mercaptan odors. The improved compositions are relatively stable over extended periods and polymerize rapidly to produce coatings with desirable mechanical properties.

Having thus described the invention, we claim:

1. A cationically photopolymerizable composition consisting essentially of:
   A. 50–99 percent by weight of a cationically polymerizable material, said cationically polymerizable material comprising essentially the sole polymerizable material in said composition;
   B. at least 0.1 percent by weight of a sulfonium salt photoinitiator which decomposes upon exposure to electromagnetic radiation to provide a Lewis acid to initiate polymerization of said cationically polymerizable material, said sulfonium salt photoinitiator upon decomposition generating an odorous organic sulfur compound;
   C. 0.1–15 percent by weight of an organic sulfur compound scavenger operable to react with the organic sulfur compound released upon photodecomposition of said sulfonium salt photoinitiator to reduce the sulfur odor generated thereby, said scavenger being activated upon exposure to the electromagnetic radiation and being selected from the group consisting of organic ketones, benzoin compounds, aryloin oxime compounds, organic peroxide compounds, and benzilic compounds; and, D. as optional additives, vinyl chloride, fillers, diluents, dyes, pigments and processing aids.

2. The composition of claim 1 wherein said cationically polymerizable material includes an epoxidic prepolymer material in an amount providing at least about 40 percent by weight thereof.

3. The composition of claim 1 wherein said sulfonic salt photoinitiator has the following structural formula:

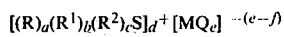

where R is a monovalent aromatic organic radical; $R^1$ is a monovalent organic aliphatic radical selected from alkyl, cycloalkyl and substituted alkyl; $R^2$ is a polyvalent organic radical forming a heterocyclic or fused ring structure selected from aliphatic radicals and aromatic radicals; M is a metal or metalloid; Q is a halogen radical; a is a whole number equal to 0 to 3 inclusive; b is a whole number equal to 0 to 2 inclusive; c is a whole number equal to 0 or 1; and where the sum of $a+b+c$ is a value equal to 3 or the valence of S; $d=e-f$; $f=$valence of M and is an integer equal to from 2 to 7 inclusive; and e is greater than f and is an integer having a value up to 8.

4. The composition of claim 1 wherein said sulfonium salt photoinitiator has the following formula:

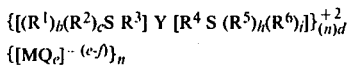

wherein Y may be omitted or may be a bridging atom or group which connects $R^3$ and $R^4$, e.g., a divalent sulfur —S—, a divalent oxygen —O—, a divalent nitrogen

or a divalent carbon

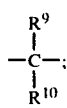

or a ketone group

wherein $R^2$ and $R^6$ are monovalent organic aliphatic radicals selected from alkyl, cycloalkyl and substituted alkyl; $R^1$ and $R^5$ are organic aromatic radicals which may or may not be ring-substituted; wherein $R^3$ and $R^4$ are organic aromatic radicals which may or may not be ring-substituted; wherein $R^9$, $R^{10}$ and $R^{11}$ may be hydrogen, or substituted or unsubstituted alkyl or aryl groups; wherein b and h may be equal to the integer 0, 1 or 2; wherein c and i may be equal to the integer 0, 1 or 2; the sum of $b+c$, or of $h+i$ being 2; wherein $d=\frac{1}{2}(e-f)$ and n is the multiplier of d necessary to produce a whole number; wherein $f=$ the valence of M and is an integer from 2-7 inclusive; wherein e is greater than f and is an integer having a value up to 8.

5. The composition of claim 1 wherein said sulfonium salt photoinitiator has the following formula:

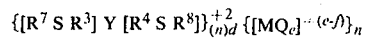

wherein Y may be omitted or may be a bridging atom or group which connects $R^3$ and $R^4$, e.g., a divalent sulfur —S—, a divalent oxygen —O—, a divalent nitrogen

or a divalent carbon

or a ketone group

wherein $R^3$ and $R^4$ are organic aromatic radicals; wherein $R^7$ and $R^8$ are polyvalent organic radicals forming a heterocyclic or fused ring structure with the sulfur atom and may be the same or different; wherein $R^9$, $R^{10}$ and $R^{11}$ may be hydrogen, or substituted or unsubstituted alkyl or aryl groups; wherein $d=\frac{1}{2}(e-f)$ and n is the multiplier of d necessary to produce a whole number; wherein $f=$ the valence of M and is an integer from 2-7 inclusive; wherein e is greater than f and is an integer having a value up to 8.

6. The composition of claim 3 wherein said sulfonium salt photoinitiator is present in an amount equal to 0.1-10 percent by weight of the composition and wherein said scavenger is activated to a free radical and is present in an amount equal to at least about one-half the molar equivalent of the sulfonium salt photoinitiator.

7. The composition of claim 4 wherein said sulfonium salt photoinitiator is present in an amount equal to 0.1-10 percent by weight of the composition and wherein said scavenger is activated to a free radical and is present in an amount equal to at least about the molar equivalent of the sulfonium salt photoinitiator.

8. The composition of claim 5 wherein said sulfonium salt photoinitiator is present in an amount equal to 0.1-10 percent by weight of the composition and wherein said scavenger is activated to a free radical and is present in an amount equal to at least about the molar equivalent of the sulfonium salt photoinitiator.

9. The composition of claim 3 wherein said sulfonium salt photoinitiator is present in an amount equal to 0.1-10 percent by weight of the composition and wherein said scavenger is activated to a triplet state and is present in an amount equal to at least about the molar equivalent of the sulfonium salt photoinitiator.

10. The composition of claim 4 wherein said sulfonium salt photoinitiator is present in an amount equal to 0.1-10 percent by weight of the composition and wherein said scavenger is activated to a triplet state and is present in an amount equal to at least about twice the molar equivalent of the sulfonium salt photoinitiator.

11. The composition of claim 5 wherein said sulfonium salt photoinitiator is present in an amount equal to 0.1–10 percent by weight of the composition and wherein said scavenger is activated to a triplet state and is present in an amount equal to at least about twice the molar equivalent of the sulfonium salt photoinitiator.

12. In a method of cationic polymerization, the steps comprising:
   A. admixing 50–99 parts by weight of a cationically polymerizable material as essentially the sole polymerizable material, at least 0.1 part by weight of a sulfonium salt photoinitiator which decomposes upon exposure to electromagnetic radiation to provide a Lewis acid to initiate polymerization of said cationically polymerizable material, said sulfonium salt photoinitiator upon decomposition generating an odorous organic sulfur compound; 0.1–15 percent by weight of an organic sulfur compound scavenger operable to react with the organic sulfur compound released upon photodecomposition of said sulfonium salt photoinitiator to reduce the sulfur odor generated thereby, said scavenger being activated upon exposure to the electromagnetic radiation and being selected from the group consisting of organic ketones, benzoin compounds, aryloin oxime compounds, organic peroxide compounds, and benzil compounds and, as optional additives, vinyl chloride, fillers, diluents, dyes, pigments and processing aids to form a cationically photopolymerizable composition consisting essentially of said cationically polymerizable material, sulfonium salt photoinitiator, organic sulfur compound scavenger and processing aids; and
   B. exposing said composition to electromagnetic radiation to decompose said sulfonium salt photoinitiator to generate a Lewis acid to initiate polymerization of said polymerizable material and to activate said scavenger to react with organic sulfur compounds generated by decomposition of said sulfonium salt photoinitiator, said polymerization being characterized by substantial freedom from malodorous sulfur compounds.

13. The method of claim 12 wherein said photopolymerizable composition is applied to a substrate as a coating prior to said step of exposure to electromagnetic radiation.

14. The method of claim 12 wherein said cationically polymerizable material includes an epoxidic prepolymer material in an amount providing at least about 40 percent by weight thereof.

15. The method of claim 12 wherein said sulfonium salt photoinitiator has the following structural formula:

$$[(R)_a(R^1)_b(R^2)_c S]_d^+ \ [MQ_e]^{-(e-f)}$$

where R is a monovalent aromatic organic radical; $R^1$ is a monovalent organic aliphatic radical selected from alkyl, cycloalkyl and substituted alkyl; $R^2$ is a polyvalent organic radical forming a heterocyclic or fused ring structure selected from aliphatic radicals and aromatic radicals; M is a metal or metalloid; Q is a halogen radical; a is a whole number equal to 0 to 3 inclusive; b is a whole number equal to 0 to 2 inclusive; c is a whole number equal to 0 or 1; and where the sum of a+b+c is a value equal to 3 or the valence of S; d=e−f; f=valence of M and is an integer equal to from 2 to 7 inclusive; and e is greater than f and is an integer having a value up to 8.

16. The method of claim 12 wherein said sulfonium salt photoinitiator has the following formula:

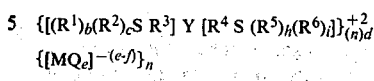

wherein Y may be omitted or may be a bridging atom or group which connects $R^3$ and $R^4$, e.g., a divalent sulfur —S—, a divalent oxygen —O—, a divalent nitrogen

or a divalent carbon

or a ketone group

wherein $R^2$ and $R^6$ are monovalent organic aliphatic radicals selected from alkyl, cycloalkyl and substituted alkyl; $R^1$ and $R^5$ are organic aromatic radicals which may or may not be ring-substituted; wherein $R^3$ and $R^4$ are organic aromatic radicals which may or may not be ring-substituted; wherein $R^9$, $R^{10}$ and $R^{11}$ may be hydrogen, or substituted or unsubstituted alkyl or aryl groups; wherein b and h may be equal to the integer 0, 1 or 2; wherein c and i may be equal to the integer 0, 1 or 2; the sum of b+c or of h+i being 2; wherein $d = \frac{1}{2}(e-f)$ and n is the multiplier of d necessary to produce a whole number; wherein f=the valence of M and is an integer from 2–7 inclusive; wherein e is greater than f and is an integer having a value up to 8.

17. The method of claim 12 wherein said sulfonium salt photoinitiator has the following formula:

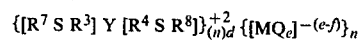

wherein Y may be omitted or may be a bridging atom or group which connects $R^3$ and $R^4$, e.g., a divalent sulfur —S—, a divalent oxygen —O—, a divalent nitrogen

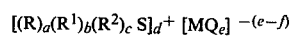

or a divalent carbon

or a ketone group

wherein $R^3$ and $R^4$ are organic aromatic radicals; wherein $R^7$ and $R^8$ are polyvalent organic radicals forming a heterocyclic or fused ring structure with the sulfur atom and may be the same or different; wherein $R^9$, $R^{10}$ and $R^{11}$ may be hydrogen, or substituted or unsubstituted alkyl or aryl groups; wherein $d=\frac{1}{2}(e-f)$ and n is the multiplier of d necessary to produce a whole number; wherein f=the valence of M and is an integer from 2–7 inclusive; wherein e is greater than f and is an integer having a value up to 8.

18. The method of claim 12 wherein said composition is maintained at a temperature of 50°–90° C. for 0.5 second to 2 minutes following initiation of exposure to electromagnetic radiation.

* * * * *